(12) United States Patent
Kamata

(10) Patent No.: US 9,576,200 B2
(45) Date of Patent: Feb. 21, 2017

(54) BACKGROUND MAP FORMAT FOR AUTONOMOUS DRIVING

(71) Applicant: Toyota Motor Engineering & Manufacturing North America, Inc., Erlanger, KY (US)

(72) Inventor: Nobuhide Kamata, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 13 days.

(21) Appl. No.: 14/574,151

(22) Filed: Dec. 17, 2014

(65) Prior Publication Data

US 2016/0180171 A1    Jun. 23, 2016

(51) Int. Cl.
| | |
|---|---|
| *G06K 9/00* | (2006.01) |
| *B60W 30/095* | (2012.01) |
| *G01C 21/32* | (2006.01) |
| *G05D 1/02* | (2006.01) |
| *G08G 1/16* | (2006.01) |

(52) U.S. Cl.
CPC ...... *G06K 9/00657* (2013.01); *B60W 30/0956* (2013.01); *G01C 21/32* (2013.01); *G05D 1/0274* (2013.01); *G06K 9/00791* (2013.01); *G08G 1/16* (2013.01)

(58) Field of Classification Search
None
See application file for complete search history.

(56) References Cited

U.S. PATENT DOCUMENTS

| | | | |
|---|---|---|---|
| 7,149,626 B1* | 12/2006 | Devries | G01C 21/3626 701/25 |
| 7,421,341 B1* | 9/2008 | Hopkins | G01C 21/26 701/25 |
| 8,340,438 B2* | 12/2012 | Anderson | G05D 1/0088 348/E7.086 |

(Continued)

FOREIGN PATENT DOCUMENTS

| | | |
|---|---|---|
| JP | 2003169319 A | 6/2003 |
| JP | 2013200604 A | 10/2013 |

OTHER PUBLICATIONS

Ng et al.; "Background Subtraction Using a Pixel-Wise Adaptive Learning Rate for Object Tracking Initialization"; Video and Image Processing Laboratories (VIPER) School of Electrical and Computer Processing, Purdue University; Jan. 31, 2011; in 9 pages; West Lafayette, IN.

(Continued)

*Primary Examiner* — Jason Heidemann
(74) *Attorney, Agent, or Firm* — Christopher G. Darrow; Darrow Mustafa PC

(57) ABSTRACT

A computer-readable map format and methods of constructing the map format are disclosed. The map format includes location information for a plurality of background objects. At least one of the background objects is a seasonal background object and the location information associated with the seasonal background object is identified during a season in which an obscuration level associated with the seasonal background object is at a minimum. The obscuration level can be based on the amount that the seasonal background object is obscured or based on the amount of obscuration caused by the seasonal background object.

8 Claims, 3 Drawing Sheets

(56) References Cited

U.S. PATENT DOCUMENTS

| | | | |
|---|---|---|---|
| 8,949,196 B2* | 2/2015 | Duleba | G06F 17/30241 |
| | | | 707/673 |
| 2011/0055224 A1* | 3/2011 | Rossio | G01C 21/32 |
| | | | 707/749 |
| 2011/0150348 A1* | 6/2011 | Anderson | G05D 1/0088 |
| | | | 382/224 |
| 2014/0267734 A1* | 9/2014 | Hart, Jr. | G08G 1/07 |
| | | | 348/149 |
| 2015/0350378 A1* | 12/2015 | Hertel | H04L 67/42 |
| | | | 709/203 |

OTHER PUBLICATIONS

Zhao et al.; "Monitoring a populated environment using single-row laser range scanners from a mobile platform"; 2007 IEEE International Conference on Robotics and Automation; Apr. 10-14, 2007; in 7 pages; Roma, Italy.

\* cited by examiner

BACKGROUND MAP FORMAT FOR AUTONOMOUS DRIVING

BACKGROUND

Fully or highly automated driving systems are designed to operate a vehicle on the road without driver interaction or other external control, for example, self-driving vehicles or autonomous vehicles. Operating autonomously requires certainty in both the location of stationary objects, such as road signs and natural features of the environment, and detection and tracking of moving objects proximate to these stationary objects, such as other vehicles and pedestrians proximate to the autonomous vehicle. In order to improve reaction time of the autonomous vehicle, both stationary and moving objects should be recognized as accurately and as quickly as possible. Once recognized, location information associated with some stationary objects can be added to a background map format designed to be ignored during object tracking to allow the autonomous vehicle to reduce processing time.

One prior art automated driving system includes a background map format that automatically adds new background objects to the background map format once the objects are recognized as motionless by the autonomous vehicle while the autonomous vehicle traverses a route. Another prior art automated driving system includes means for transforming three-dimensional data captured for background objects into two-dimensional data in order to use less storage space in a background map format. However, there is a need for a background map format configured to include a minimum amount of location information for background objects in order improve the accuracy of moving object tracking and significantly reduce computing time for the autonomous vehicle to more rapidly make driving decisions.

SUMMARY

A computer-readable map format in the form of a background map for use by an automated driving system in an autonomous vehicle is disclosed. To construct the map format, either satellites or a perception system disposed on the autonomous vehicle can capture location information for various background objects, that is, objects that can be ignored during moving object detection and tracking processes used by the autonomous vehicle to make driving decisions. At least some of the background objects are seasonal background objects, that is, background objects that can be captured during a season, such as winter, spring, summer, or fall, where an obscuration level associated with the background object is at a minimum. The obscuration level associated with the seasonal background objects can be based either on how much the seasonal background object obscures other objects or on how much the seasonal background object is itself obscured.

In one implementation, a computer-readable map format for an autonomous vehicle is disclosed. The map format includes location information for a plurality of background objects. At least one of the background objects is a seasonal background object. The location information associated with the seasonal background object is identified during a season in which an obscuration level associated with the seasonal background object is at a minimum.

In another implementation, a method of constructing a computer-readable map format for an autonomous vehicle is disclosed. The method includes identifying location information for a plurality of background objects wherein at least some of the background objects are seasonal background objects. The location information associated with the seasonal background objects is identified during a season in which an obscuration level associated with the seasonal background objects is at a minimum.

BRIEF DESCRIPTION OF THE DRAWINGS

The description herein makes reference to the accompanying drawings wherein like reference numerals refer to like parts throughout the several views, and wherein.

DETAILED DESCRIPTION

Computer-readable map formats and methods for constructing computer-readable map formats for use by an autonomous vehicle are disclosed. An example method can include identifying location information, that is, geographic details, for a plurality of background objects to construct a background map format. The background objects are objects that can be ignored during moving object detection and tracking processes performed by the autonomous vehicle. At least some of the background objects can be seasonal background objects, that is, background objects where the location information is captured during a specific season, such as winter, spring, summer, or fall. To construct a background map with a minimum amount of information in order to improve the accuracy of moving object detection and tracking, the location information associated with the seasonal background objects can be identified during a season in which an obscuration level associated with the seasonal background object is at a minimum.

Figure 1:
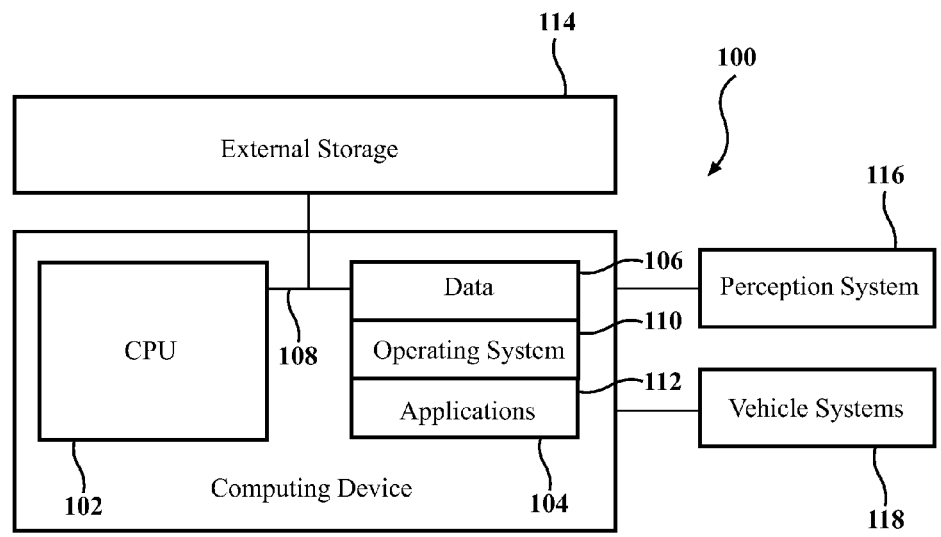
FIG. 1 is a block diagram of a computing device.

FIG. 1 is a block diagram of a computing device 100, for example, for use with an automated driving system. The computing device 100 can be any type of vehicle-installed, handheld, desktop, or other form of single computing device, or can be composed of multiple computing devices. The processing unit in the computing device can be a conventional central processing unit (CPU) 102 or any other type of device, or multiple devices, capable of manipulating or processing information. A memory 104 in the computing device can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs that permit the CPU 102 to perform automated driving methods using the background map format described below. The computing device 100 can also include secondary, additional, or external storage 114, for example, a memory card, flash drive, or any other form of computer readable medium. The installed applications 112 can be stored in whole or in part in the external storage 114 and loaded into the memory 104 as needed for processing.

The computing device 100 can also be in communication with a perception system 116. The perception system 116 can capture data and/or signals for processing by an inertial measurement unit (IMU), a dead-reckoning system, a global navigation satellite system (GNSS), a light detection and ranging (LIDAR) system, a radar system, a sonar system, an image-based sensor system, or any other type of system capable of capturing information specific to the environment surrounding a vehicle for use in creating a background map format as described below, including information specific to both stationary and moving objects such as traffic signs, natural objects, moving vehicles, pedestrians, or other localized position data and/or signals, and outputting corresponding data and/or signals to the CPU 102.

In the examples described below, the perception system 116 can capture, at least, signals for a GNSS or other system that determines vehicle position and velocity and data for a LIDAR system or other system that determines the location of obstacles, objects, or other environmental features including traffic signs, trees, shrubs, neighboring vehicles, pedestrians, etc. The computing device 100 can also be in communication with one or more vehicle systems 118, such as vehicle braking systems, vehicle propulsions systems, etc. The vehicle systems 118 can also be in communication with the perception system 116, the perception system 116 being further configured to capture data indicative of performance of the vehicle systems 118.

Figure 2:
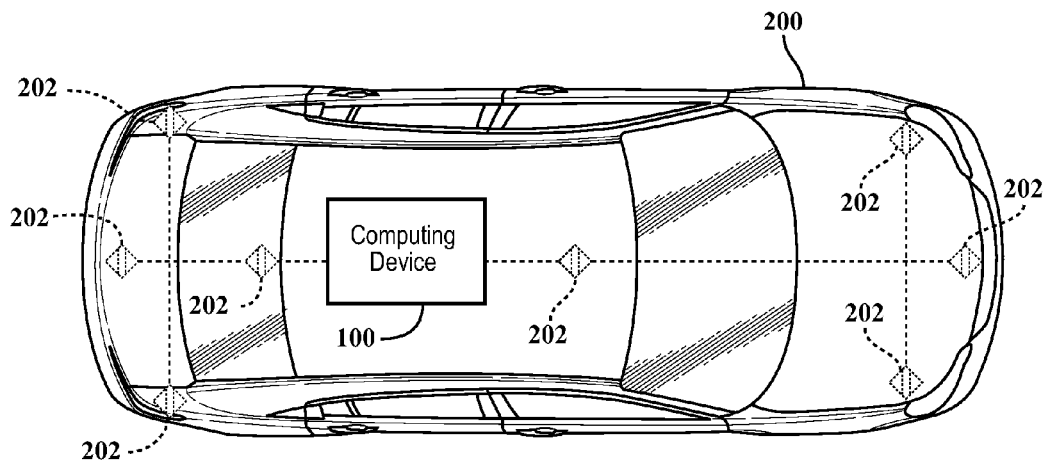
FIG. 2 is a schematic illustration of an autonomous vehicle including the computing device of FIG. 1.

FIG. 2 is a schematic illustration of an autonomous vehicle 200 including the computing device 100 of FIG. 1. The computing device 100 can be located within the autonomous vehicle 200 as shown in FIG. 2 or can be located remotely from the autonomous vehicle 200 in an alternate location (not shown). If the computing device 100 is located remotely from the autonomous vehicle 200, the autonomous vehicle 200 can include the capability of communicating with the computing device 100.

The autonomous vehicle 200 can also include a plurality of sensors 202, the sensors 202 acting as integral components of the perception system 116 described in reference to FIG. 1. One or more of the sensors 202 can be configured to capture location information for objects within the environment surrounding the autonomous vehicle 200 for use by the computing device 100 to estimate position and orientation of the autonomous vehicle 200, images for processing by an image sensor, vehicle position in global coordinates based on signals from a plurality of satellites, or any other data and/or signals that could be used to determine the current state of the autonomous vehicle 200 or determine the position of the autonomous vehicle 200 in respect to its environment for use in either creating a map format or determining the autonomous vehicle's 200 position in respect to the map format.

Map formats can be constructed using location-based geographic features captured by the autonomous vehicle 200 for road-based objects such as traffic lights, traffic signs, lane lines, crosswalks, and curbs proximate to the autonomous vehicle 200 as it travels a route. Information representing these geographic features can be captured using the above described LIDAR system and/or cameras in combination with an algorithm such as a random sample consensus (RANSAC) to differentiate lines, record the position of the autonomous vehicle 200, and collect data on position from a GNSS and/or an IMU. The captured information for these geographic features can then be manipulated using a simultaneous localization and mapping (SLAM) technique to position all of the geographic features in relation to the position of the autonomous vehicle 200.

Alternatively, map formats can be constructed using overhead images (e.g. satellite images) of geographic features traced by a map editor that allows selection of different categories for each geographic feature, for example, traffic sign, road marking, etc. Any map format used by the autonomous vehicle 200 can be stored, for example, in the memory 104 of the computing device, in plain text, binary, or xml. A background map format can be constructed using location information for geographic features that are able to be ignored during moving object detection and tracking processes performed by the autonomous vehicle 200 for decision making while traveling a planned vehicle path. This group of geographic features, that is, background objects, can include stationary road-based objects, or road features, such as traffic signs, guardrails, berms, etc., and mostly stationary natural objects such as trees, shrubs, or bushes that can produce foliage. Improved means for constructing a background map format of these background objects are described below.

Figure 3D:
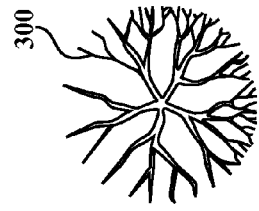
FIGS. 3A-3F show the progression of representing a seasonal background object on a background map format in two different seasons.
Figure 3A:
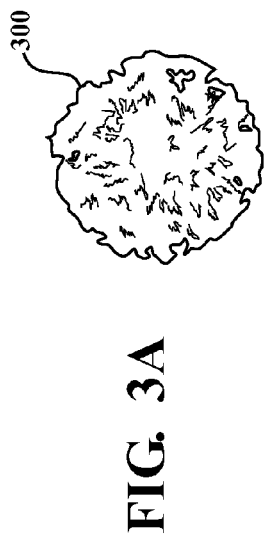
Figure 3E:
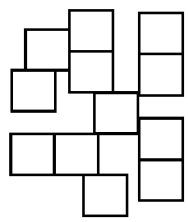
Figure 3B:
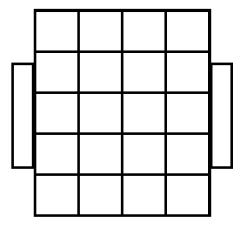
Figure 3F:
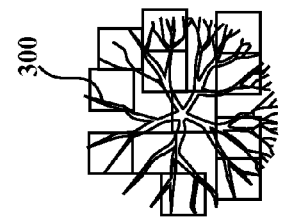
Figure 3C:
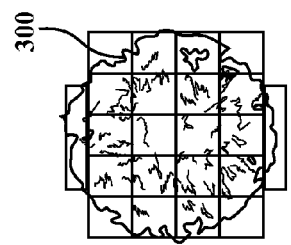

FIGS. 3A-3F show the progression of representing a seasonal background object on a background map format in two different seasons. In FIG. 3A, an image of a tree 300 is shown from a top-down view as covered in leaves and as captured, for example, by a satellite. The leafy tree 300 could have been captured by the satellite in late spring, summer, or early fall seasons given the density of the leaves. FIG. 3B shows a matrix of blocks representing the leafy tree 300 in two dimensions as would be used to represent the leafy tree 300 as a seasonal background object on the background map format. FIG. 3C shows an overlay of the two-dimensional matrix of blocks of FIG. 3B on the image-based capture of the leafy tree 300 of FIG. 3A. The image of the leafy tree 300 can be captured a predetermined number of times from the same position of the satellite (or the same position of the perception system 116 on the autonomous vehicle 200) before the two-dimensional matrix of blocks representing the leafy tree 300 is saved to the background map format.

In FIG. 3D, the same tree 300 is shown from a top-down view as bare of leaves, and again, as captured by a satellite. The bare tree 300 could have been captured by the satellite in late fall, winter, or early spring seasons given the lack of leaves present on the tree 300. FIG. 3E shows a matrix of blocks representing the bare tree 300 in two dimensions as would be used to represent the bare tree 300 on the background map format. FIG. 3F shows an overlay of the two-dimensional matrix of blocks of FIG. 3E on the image-based capture of the bare tree 300 of FIG. 3D. Again, the bare tree 300 can be captured a predetermined number of times by either the satellite or the perception system 116 before the two-dimensional matrix of blocks representing the bare tree 300 is saved to the background map format.

Comparing FIG. 3F to FIG. 3C, less information is captured for the tree 300 in the late fall, winter, or early spring seasons than would be captured in the late spring, summer, or early fall seasons due to the changes in foliage. Foliage is capable of obscuring any moving objects present underneath or nearby the tree 300 such as pedestrians or cyclists. To minimize the amount that the tree 300 could obscure other objects before saving its location information in the background map format, that is, to minimize its obscuration level for moving object detection and tracking purposes, the tree 300 can be captured in one of the late fall, winter, or early spring seasons when foliage is at a minimum. Additional background objects and related obscuration levels are described further below.

Figures 4, 5:
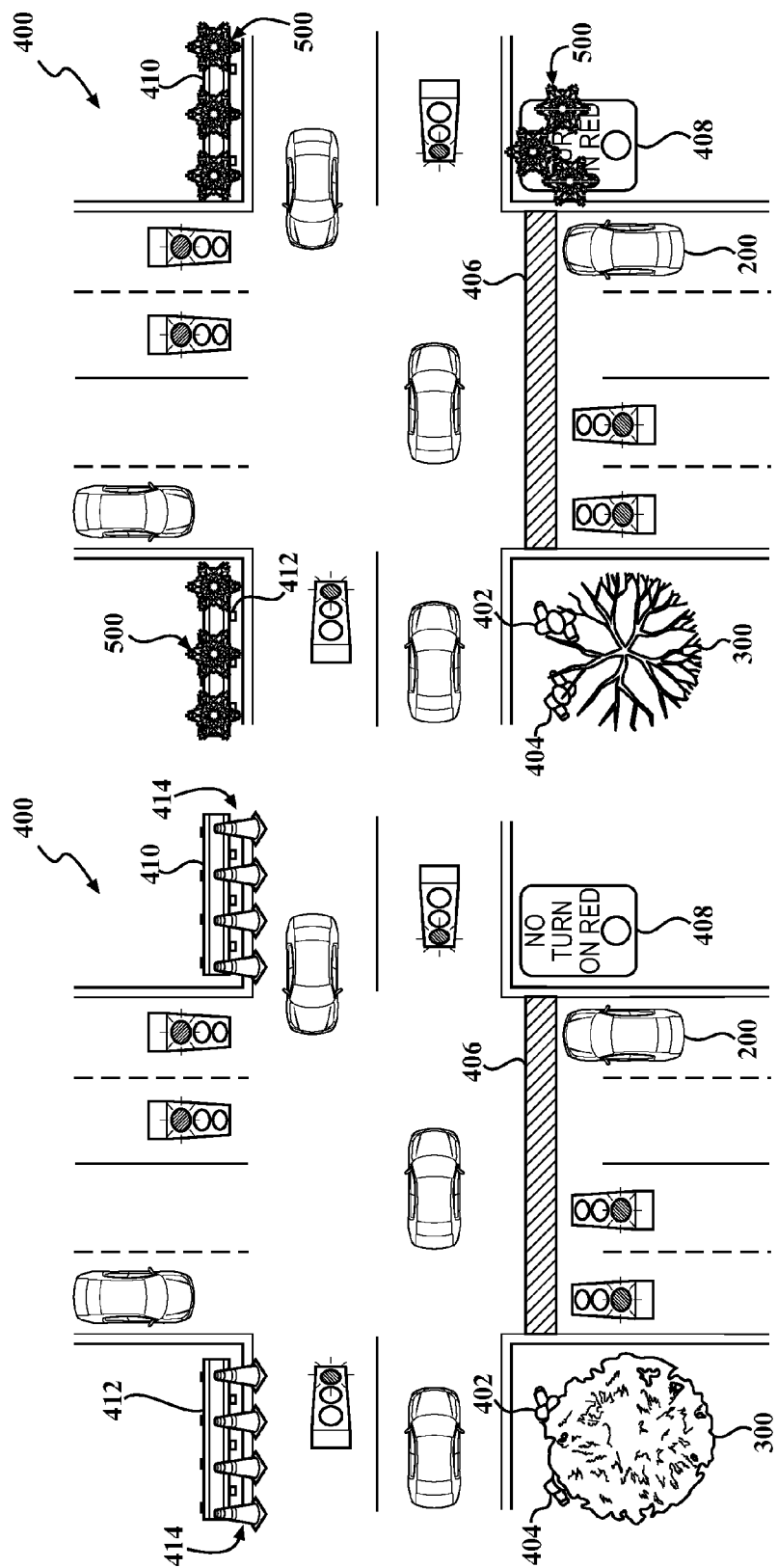
FIG. 4 shows a cross-shaped intersection including a plurality of seasonal background objects and the autonomous vehicle of FIG. 2 during a summer season.
FIG. 5 shows the cross-shaped intersection and plurality of seasonal background objects of FIG. 4 during a winter season.

FIG. 4 shows a cross-shaped intersection 400 including a plurality of seasonal background objects and the autonomous vehicle 200 of FIG. 2 during a summer season. Seasonal background objects should be captured in a season where an obscuration level associated with the seasonal background objects is at a minimum in order for the background map format to be most useful for autonomous driving. The obscuration level associated with a seasonal background object can be based on the amount of obscuration caused by the seasonal background object. For example, the leafy tree 300 of FIGS. 3A and 3C is also shown in FIG. 4 as obscuring a pair of pedestrians 402, 404 before the pedestrians 402, 404 enter a crosswalk 406 in front of the autonomous vehicle 200. The leafy tree 300, an example seasonal background object, should not be captured during the summer season for use in the background map format, as the foliage present on the limbs of the leafy tree 300 can obscure moving objects such as the pedestrians 402, 404.

The obscuration level associated with a seasonal background object can also be based on the amount that the seasonal background object is obscured. For example, as FIG. 4 shows the intersection 400 during a summer season, a traffic sign 408 located to the right of the autonomous vehicle 200 is not obscured at all, that is, the obscuration level associated with the traffic sign 408 is at a minimum, and location information for the traffic sign 408 can be captured during the summer season. In another road-feature example of seasonal background objects, a pair of guardrails 410, 412 is located along the cross-street in front of the autonomous vehicle 200 within the intersection 400. The guardrails 410, 412 are partially obscured by a plurality of traffic cones 414 in this example, so location information for the guardrails 410, 412 should not be captured during the summer season.

If the background map format is updated during the summer season when the traffic cones 414 are present in front of the guardrails 410, 412, the traffic cones 414 may be characterized as background objects. However, the next time that the background map format is updated, e.g. during a different season when construction is not present, the perception system 116 can capture information indicating a high probability that the traffic cones 414 are no longer present (or a low probability that the traffic cones 414 are present). Given the absence of the traffic cones 414, the background map format can be updated to remove the location information related to the traffic cones 414. Thus, the background map format can be configured to include the latest position for each of the plurality of background objects.

FIG. 5 shows the cross-shaped intersection 400 and plurality of seasonal background objects of FIG. 4 during a winter season. In FIG. 5, the tree 300 has lost all of its leaves and is now bare during the winter season. The same pedestrians 402, 404 are approaching the same crosswalk 406, but in this example, the bare tree 300 obscures the pedestrians 402, 404 much less than was the case in the FIG. 4 example. Thus, location information for the tree 300 should be captured during the winter (or late fall or early spring) in order to minimize the amount of obscuration of moving objects caused by the tree 300.

In an example of obscured background objects shown in FIG. 5, the traffic sign 408 has now become covered in a layer of snow 500. The location information for the traffic sign 408 was thus properly captured during the summer season (or could have been properly captured during the spring season or fall season) since the layer of snow 500 present during the winter season obscures at least part of the traffic sign 408. The guardrails 410, 412 are also covered in the layer of snow 500. The location information for the guardrails 410, 412 should thus not be captured during the winter season. Since the guardrails were at least partially obscured during both the summer season of FIG. 4 and the winter season of FIG. 5, the perception system 116 on the autonomous vehicle 200 or the satellites capturing images should instead focus on the seasons of spring or fall to capture location information for the guardrails 410, 412 in the intersection 400 of FIGS. 4 and 5.

The intersection 400 shown in FIGS. 4 and 5 includes many additional objects, such as moving vehicles, lane lines, curbs, traffic signals in various states, etc. The additional objects described are not necessarily background objects since location information for these objects could be used for moving object detection and tracking processes or decision-making processes performed by an automated driving system as the autonomous vehicle 200 travels a planned vehicle path. Location information for background objects, including the seasonal background objects described above, is intended to be ignored during moving object tracking processes performed by the autonomous vehicle 200.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. The scope of the claims is to be accorded the broadest interpretation so as to encompass all such modifications and equivalent structures as is permitted under the law.

What is claimed is:

1. A method of constructing a computer-readable map format for an autonomous vehicle, comprising:
   capturing signals from at least one of: a satellite, and a perception system disposed on the autonomous vehicle;
   processing the signals and identifying location information associated with a plurality of stationary background objects;
   identifying one or more seasonal background objects in the plurality of stationary background objects;
   collecting location information associated with the one or more seasonal background objects during a season in which an obscuration level associated with the seasonal background objects is at a minimum;
   constructing a computer-readable map format using the location information associated with the one or more seasonal background objects to the map format; and
   saving the map format to a non-transitory memory of a computing device associated with the autonomous vehicle.

2. The method of claim 1, comprising collecting the location information associated with the one or more seasonal background objects a predetermined number of times before saving the location information to the map format.

3. The method of claim 1, comprising basing the obscuration level associated with the seasonal background objects on an amount that the seasonal background objects are obscured.

4. The method of claim 1, wherein the seasonal background objects comprise foliage.

5. The method of claim 4, wherein the season is one of late fall, winter, and early spring.

6. The method of claim 1, wherein the seasonal background objects comprise road features.

7. The method of claim 1, wherein the map format is constructed such that the seasonal background objects are configured to be ignored from the map format during subsequent moving object detection and tracking processes used by the autonomous vehicle to make driving decisions.

8. The method of claim 1, comprising basing the obscuration level associated with the seasonal background objects on an amount of obscuration caused by the seasonal background objects.

* * * * *